(12) United States Patent
Schlittenbauer et al.

(10) Patent No.: US 9,649,938 B2
(45) Date of Patent: May 16, 2017

(54) METHOD FOR SYNCHRONIZING DISPLAY DEVICES IN A MOTOR VEHICLE

(71) Applicants: AUDI AG, Ingolstadt (DE);
Volkswagen AG, Wolfsburg (DE)

(72) Inventors: Michael Schlittenbauer, Ingolstadt (DE); Martin Roehder, Ingolstadt (DE); Heiko Maiwand, Foster City, CA (US); Nathaniel Coser, Palo Alto, CA (US); Lorenz Bohrer, Munich (DE); Alexander Sebastian Strauch, Siegen (DE)

(73) Assignees: AUDI AG, Ingolstadt (DE);
VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/759,698

(22) PCT Filed: Nov. 23, 2013

(86) PCT No.: PCT/EP2013/003542
§ 371 (c)(1),
(2) Date: Jul. 8, 2015

(87) PCT Pub. No.: WO2014/108153
PCT Pub. Date: Jul. 17, 2014

(65) Prior Publication Data
US 2015/0346836 A1    Dec. 3, 2015

(30) Foreign Application Priority Data

Jan. 8, 2013    (DE) .................. 10 2013 000 068

(51) Int. Cl.
*B60K 37/06*    (2006.01)
*G06K 9/00*    (2006.01)
(Continued)

(52) U.S. Cl.
CPC .............. *B60K 37/06* (2013.01); *G06F 3/017* (2013.01); *G06F 3/0304* (2013.01);
(Continued)

(58) Field of Classification Search
CPC ............ B60K 37/06; B60K 2350/1052; B60K 2350/2013; G60K 9/00355; G06F 3/017; G06F 3/0304; G06F 3/1423; G06F 3/1446
See application file for complete search history.

(56) References Cited

U.S. PATENT DOCUMENTS 7,289,645 B2 * 10/2007 Yamamoto ............. B60K 37/06
                                                        382/104
8,558,759 B1 * 10/2013 Prada Gomez ......... G06F 3/017
                                                        345/156
(Continued)

FOREIGN PATENT DOCUMENTS

CN    1253776 C    4/2006
CN    1932742 A    3/2007
(Continued)

OTHER PUBLICATIONS

WIPO English Language Translation of the International Preliminary Report on Patentability for PCT/EP2013/003542, mailed on Jul. 9, 2015, 8 pages.
(Continued)

*Primary Examiner* — Larry Sternbane
(74) *Attorney, Agent, or Firm* — Staas & Halsey LLP

(57) ABSTRACT

A method synchronizes two display devices in a motor vehicle. The first display device already displays a first data set which comprises a first display content relating to a predetermined thematic context. A sensor device, in particular a PMD camera, detects as a control gesture of a user, a free movement in the chamber of a body part of the user. A
(Continued)

signal which is then generated by the sensor device and which describes the control gesture, is transmitted to a gesture recognition device which generates a control signal in accordance with the determined control gesture. In accordance with the control signal, a control device determines the predetermined thematic context of the determined data set. Using the defined predetermined thematic context, an additional data set which includes a second display content of the predetermined thematic context is provided. This additional data set is displayed on the second display device.

14 Claims, 2 Drawing Sheets

(51) Int. Cl.
    *G06F 3/01*     (2006.01)
    *G06F 3/03*     (2006.01)

(52) U.S. Cl.
    CPC .. *G06K 9/00355* (2013.01); *B60K 2350/1052* (2013.01); *B60K 2350/2013* (2013.01)

(56) References Cited

U.S. PATENT DOCUMENTS

| | | | |
|---|---|---|---|
| 2006/0080005 A1* | 4/2006 | Lee | B60Q 1/22 701/1 |
| 2006/0284839 A1* | 12/2006 | Breed | B62D 1/046 345/156 |
| 2009/0027332 A1* | 1/2009 | Cieler | B60K 35/00 345/156 |
| 2012/0218295 A1* | 8/2012 | Hashikawa | B60K 35/00 345/629 |
| 2013/0021266 A1* | 1/2013 | Selim | G06F 3/0487 345/173 |
| 2014/0331185 A1 | 11/2014 | Carls et al. | |

FOREIGN PATENT DOCUMENTS

| | | |
|---|---|---|
| CN | 102575943 A | 7/2012 |
| DE | 10349568 | 5/2004 |
| DE | 102005010843 | 9/2006 |
| DE | 102007035769 | 2/2009 |
| DE | 102009036371 | 4/2011 |
| DE | 102009059867 | 6/2011 |
| DE | 102010012239 | 9/2011 |
| DE | 102010056411 | 6/2012 |
| DE | 102013000068.8 | 1/2013 |
| DE | 102011112447 | 3/2013 |
| WO | 2012/084123 | 6/2012 |
| WO | PCT/EP2013/003542 | 11/2013 |

OTHER PUBLICATIONS

German Office Action for German Priority Patent Application No. 10 2013 000 068.8, issued Oct. 28, 2013, 5 pages.
English language International Search Report for PCT/EP2013/003542, mailed May 28, 2014, 2 pages.
Chinese Office Action dated Dec. 22, 2016 from Chinese Patent Application No. 201380074326.2, 8 pages.

* cited by examiner

METHOD FOR SYNCHRONIZING DISPLAY DEVICES IN A MOTOR VEHICLE

CROSS REFERENCE TO RELATED APPLICATIONS

This application is based on and hereby claims priority to International Application No. PCT/EP2013/003542 filed on Nov. 23, 2013 and German Application No. 10 2013 000 068.8 filed on Jan. 8, 2013, the contents of which are hereby incorporated by reference.

BACKGROUND

The invention relates to a method for synchronizing two display devices of a motor vehicle.

In general, functions have previously been triggered in the motor vehicle by operating, for example, keys. To detect the operations of a key, an electrical or a capacitive switch is necessary for each key. Triggering the functions requires the operation of a button, for example a mechanical pushbutton. Display devices such as a head-up display, a display of a combined instrument or infotainment system in the motor vehicle are systems separated purely functionally. The display of information requires elaborate operation of digital menus.

DE 10 2010 056 411 A1 describes the display of information on a center display of a motor vehicle relating to a waypoint for which a reference is displayed on a predetermined other display device, namely a color display in the environment of a screen base of a front windscreen. To interact with the display devices, a finger tracking system can detect a wiping gesture of a user.

A function whereby transmission of a digital image which is displayed on a head-up display of a motor vehicle to another display device is known from DE 10 2005 010 843 A1. On the other display device, it is no longer information-carrying data but an icon which is displayed. Triggering of this function can take place via a hand movement of the user and be detected via an optoelectronic sensor.

DE 10 2007 035 769 A1 describes switching the representation of information of a display device to another display device, a video camera detecting a hand movement of a user.

Due to the many possible technical devices for displaying information, however, the disadvantage arises that the user cannot freely select the two display devices involved. A further problem arises if a multiplicity of data records for different thematic contexts are displayed on a universal display device, for example on a combined instrument with a screen. The data records may include data relating to a motor speed, to the driving speed, to the tank filling level and to detected malfunctions, for example. However, the display device of the related art to be synchronized can only be synchronized if the display device only displays data records of the same context.

SUMMARY

One possible object is to provide a method for synchronizing two arbitrary display devices.

The inventors considered on the concept of detecting an operating gesture, that is to say a movement, carried out freely in space, of a body part of the operating person, by a video camera which generates a three-dimensional image data record. In this context, the operating gesture is preferably a pointing, pulling and/or gripping gesture. This allows an elaborate installation of operating elements in the display devices to be dispensed with. In addition, it is made possible to select the involved display devices and the relevant data records.

The inventors propose a method for synchronizing a first display device of a motor vehicle with a second display device, to be synchronized, of the motor vehicle. In a non-limiting example, a head-up display may be synchronized with a display in the center console. In this context, the first display device already displays a first data record which comprises a first display content relating to a predefined thematic context. The first data record may include a picture element for example. The picture element may include a warning symbol, for example.

An optical sensor device detects an operating gesture of a user. The optical sensor device may include a PMD camera (i.e., a photonic mixing device). The sensor device generates a signal describing the operating gesture (e.g., a video signal) on the basis of 3D image data and transmits this to a gesture detection device. On reception of the signal of the sensor device, the gesture detection device determines, by the determined operating gesture, the data record selected by the user by the operating gesture and the data record already displayed by the first display device.

A control device, for example a control device of the motor vehicle, receives a control signal generated by the gesture detection device which describes the first data record determined, and determines, by the control signal, the predefined thematic context of the first data record.

The control device can be, for example, also a program module of the first or of the second display device or can be implemented in a plurality of part areas, e.g. both display devices. In a non-limiting example, if the control device is a program module of the first display device, it can determine (e.g., by itself), on the basis of the control signal, that is to say on the basis of a trigger of the gesture detection device, the determined predefined thematic context of the selected data record and transmit it to the second display device.

By the predetermined thematic context determined, a further data record having a second display content of the predetermined thematic context is provided. The further data record is displayed on the second display device. Providing the further data record can be carried out, e.g., by one of the display devices or by a data processing device of the motor vehicle, possibly in interaction with a central data server on the Internet. In a non-limiting example, if the first display device transmits the predetermined thematic context of the selected data record determined to the second display device, it can thus independently determine and display the further data record. The constellation which is selected here can depend on the technical environment in which the proposed method is implemented.

Thus, the first data record can include an image data record whilst the further data record can include a detailed description, in the form of text for example. Thus, a text file supplementing the image file can be displayed on the second display device. As non-limiting examples the image record can include a warning symbol for a reference to an operating state of the vehicle, such as a critical operating state of the motor vehicle. As non-limiting examples the detailed description in the form of text can include text relating to the (critical) operating state of the motor vehicle. Thus, a text file which provides a description of a fault can supplement the image file and be displayed on the second display device.

Apart from the above-mentioned advantages, the advantage is obtained that the display contents are not only exchangeable, but different data records having a different amount of information content relating to a context can be output. In spite of a multiplicity of various information items on a display, the user, therefore, does not have to operate an operating element such as a key or a digital menu for the precise selection of a data record. As a result, the user can also select when he wishes to have which volume of information displayed for which information.

In one embodiment of the method according to the method, the control device can control the transmission of the further data record from a motor-vehicle-internal data memory to the display device to be synchronized. In this case, various groups of data records are present in the data storage device, a group of data records comprising those data records which have a common thematic context.

However, the contexts are here the least of which was known before the synchronization and must be stored in at least one data storage device. Alternatively or additionally, the control device can call up the further data record from an external data server, e.g. from an Internet server of a motor vehicle manufacturer or generate, on the basis of operating parameters which are provided by a device for operating the motor vehicle, the further data record. Such data records can be provided by the control device in a group of data records of the data memory.

At least one of the display devices is preferably equipped without its own sensor. In particular, neither display device is equipped with its own sensor system. The operating gesture is preferably detected by an optical sensor device on the basis of 3D image data of a time-of-flight camera (TOF camera), PMD camera or stereocamera of the motor vehicle which is preferably a part of another device of the motor vehicle. The three-dimensional detection of the operating gesture provided enables a directional movement to be detected and increases the number of variations of operating gestures. Due to the spatially precise detection, the display devices to be synchronized become freely selectable and a multiplicity of display devices can be used for the information flow to the user. A sensor device of this type, already present in the motor vehicle, can be used for the method without the display devices having to be equipped with sensors. In addition, operating elements such as pushbuttons or touch-sensitive buttons can be omitted in the display device.

In a further preferred embodiment, the gesture detection device, by the signal of the sensor device, determines which of the display devices is the display device already displaying the data record and which of the display devices is the display device to be synchronized. This can be done by a pulling gesture from one display device to another for example. The display devices thus no longer have to be selected by the elaborate operation of a menu, such as by using keys.

In a development of this embodiment of the method, the gesture detection device, for the purposes of detecting at least a part of the operating gesture, can check a trajectory of a body part, that is to say a motion curve of a moving body part, to see whether it describes a pulling and/or gripping movement from the first display device to the second display device. In this manner, the direction of synchronization is detected.

The gesture detection device, for detecting the operating gesture, can extend the trajectory of a body part by extrapolation of the part of the operating gesture, and check whether the extended trajectory represents a pulling and/or gripping movement. This provides for faster operation. Thus, the operating gesture does not need to be completed by the user if he has to move the body part carrying out the gesture spontaneously back to the steering wheel for example.

The object mentioned above is also achieved by a motor vehicle, particularly a car or a passenger vehicle, if it comprises a gesture detection device and is designed for carrying out an embodiment of the proposed method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
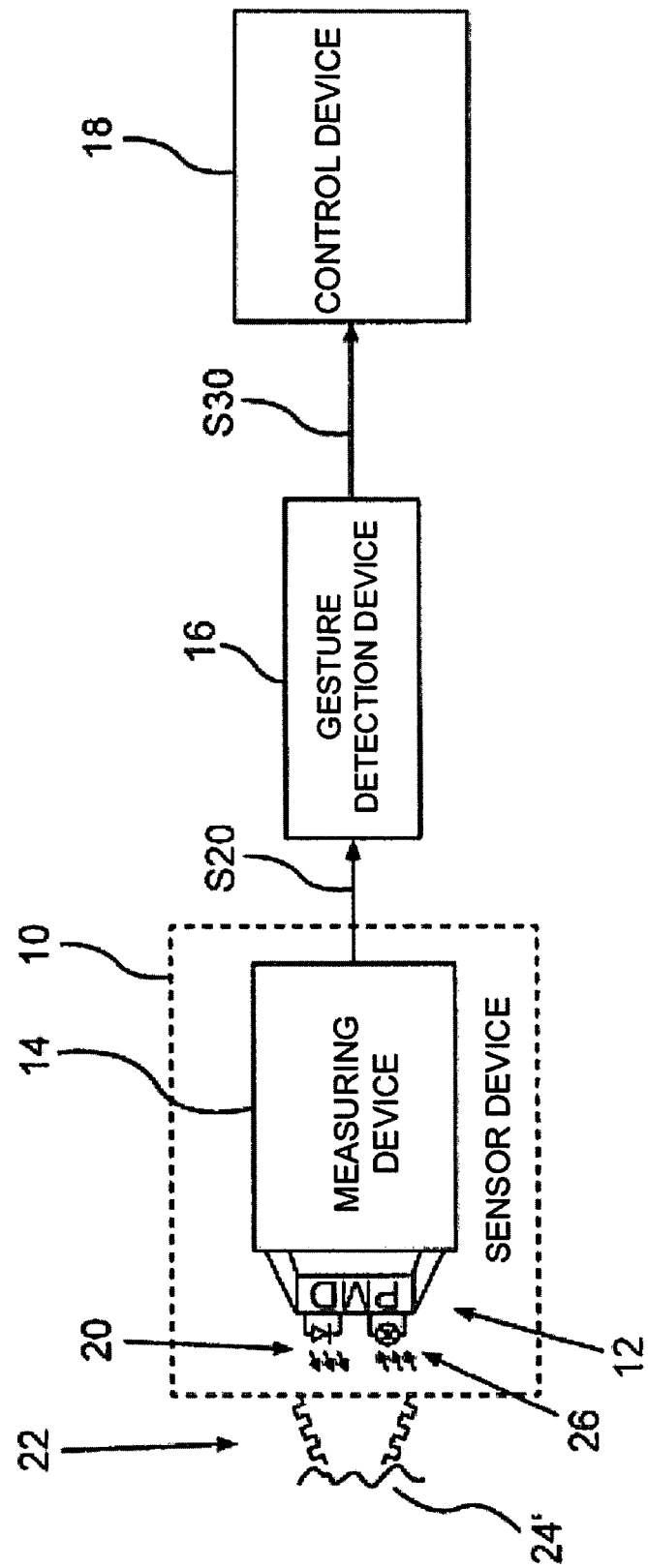
FIG. 1 shows a block diagram for a sensor device and for a control device which can be installed in an embodiment of the proposed motor vehicle.

Reference will now be made in detail to the preferred embodiments of the present invention, examples of which are illustrated in the accompanying drawings, wherein like reference numerals refer to like elements throughout.

In FIG. 1, a sensor device 10 of a motor vehicle, for example a passenger vehicle, is shown. In the present example, the sensor device 10 may include an optical sensor 12. The optical sensor may be a PMD camera for example. The sensor device may further include a measuring device 14 which can detect the measurement data of the optical sensor 12 (method S10) and transmit them to a gesture detection device 16 (S20). The optical sensor 12 can also include another 3D camera. The 3D camera may be, for example, a TOF camera or a stereocamera and is preferably mounted on the ceiling of the motor vehicle.

The optical sensor 12 can be designed in a manner known per se. The optical sensor may be designed with a luminous source 20, such as an infrared lamp which illuminates a detection area 22. The detection area 22 may be, for example, a space above a dashboard of the motor vehicle. If this contains an object, the electromagnetic radiation radiated by the luminous source 20 is reflected back to a sensor array 26. The object may be, for example a hand 24' of the driver of the motor vehicle. By the sensor array 26, 3D image data can then be generated which specify 3D coordinates relating to individual area elements of the hand 24'. Additionally or alternatively, the interior space of the motor vehicle can also be surveyed in this manner. The 3D image data are transmitted by the measuring device 14 to the gesture detection device 16.

The gesture detection device 16 can be a gesture detection device 16 known to the expert.

By the gesture detection device 16, extremities can be segmented from the 3D image data, by which, for example, the position of a fingertip in the detection area 22 can be determined. In this context, segmenting algorithms known per se can be used as a basis. The 3D image data of the sensor array 26 of the optical sensor 12 can also represent a sequence of successive 3D images, i.e. by the optical sensor 12, movements of the hand 24' or an extension of a lower arm can also be detected. By tracing the trajectory, for example of the fingertip in this 3D image sequence, particularly by tracing the position and the speed of the fingertip, a gesture of movement indicated by the fingertip can thus be extrapolated from the trajectory.

Depending on this evaluation, the gesture detection device 16 then generates a control signal (S30). FIG. 1 also shows a control device 18 of the motor vehicle which can be a control device for controlling two (not shown in FIG. 1) display devices 30, 34. The control device 18 receives the control signal of the gesture detection device 16 and coordinates the interaction of the display devices 30, 34 to be synchronized.

Figure 2:
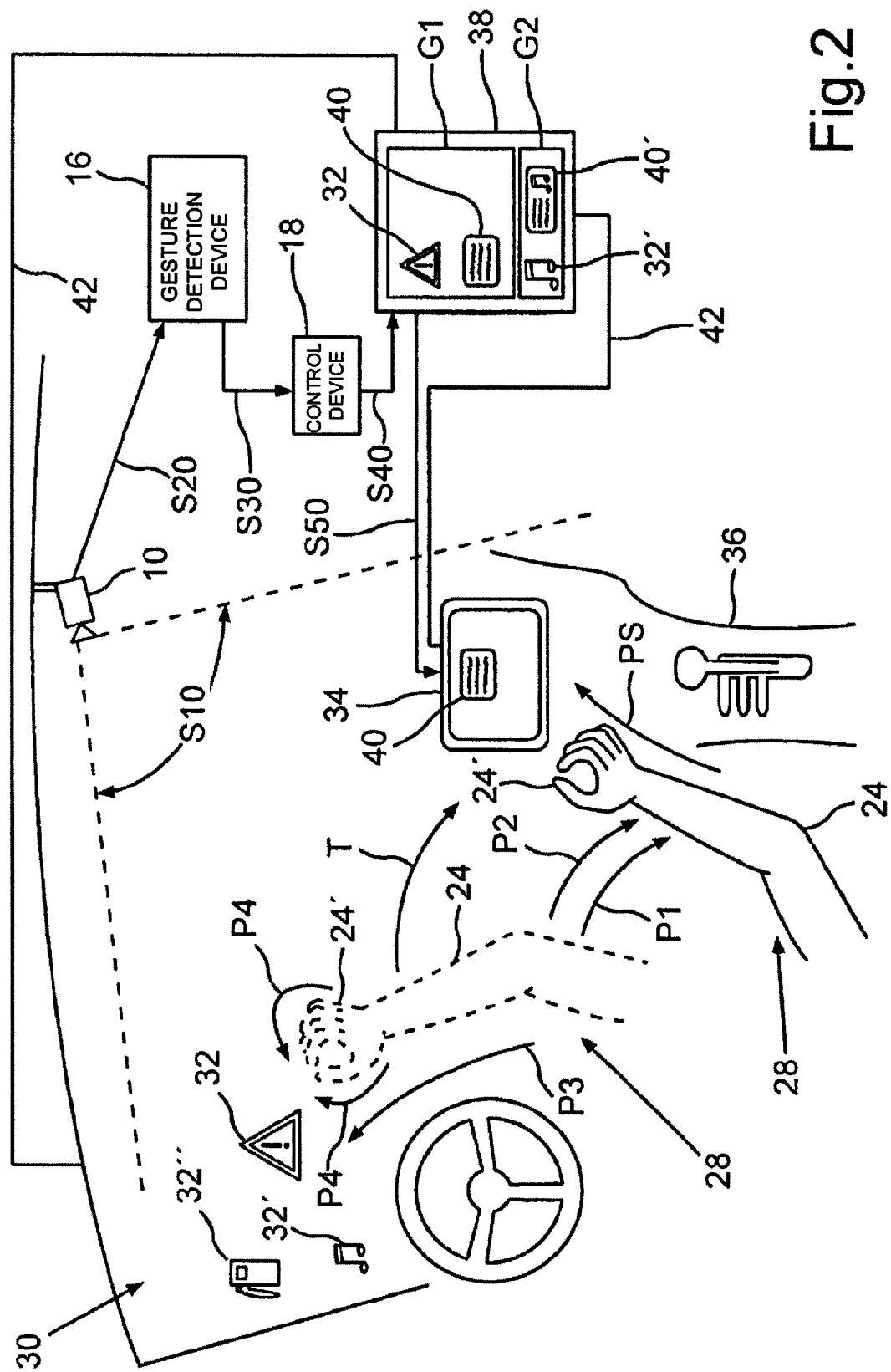
FIG. 2 shows a sketch for an embodiment of the proposed method.

FIG. 2 shows an embodiment of the proposed method.

As shown in the example of FIG. 2, a data record from a group of data records can be transmitted from a data storage device 38 to the display device to be synchronized for displaying the data record during the coordination of the interaction of the display devices 30, 34 to be synchronized. In this case, the control device 18 can thus generate, on reception of the control signal of the gesture detection device 16, a synchronizing signal which causes the second display device 34 to call up a particular data record 40 from the data storage device 38 or which causes the data storage device 38 to transfer the data record 40 to the second display device 34. In actuality, this can look as follows:

A user is located in the interior space of a motor vehicle. On a first display device 30, a plurality of picture elements 32, 32', 32" are displayed. The first display device 30 can be a head-up display on a windscreen for example, and the plurality of picture elements can include warning or other symbols which signal an operating state. In FIG. 2 the picture element 32 is an image of a warning triangle which informs the user of the presence of important operating information. In FIG. 2, a first position of a body part 24 of the user, (a lower arm) with a hand 24' (dashed line), and a second position of the body part 24 (continuous line) are shown. The positions P1 and P2 symbolize a movement of the body part 24 from the first to the second position. In the present example, this movement with the finger position shown is an operating gesture for synchronizing a display 34 of an infotainment system above the center console 36 with the display device 30. The sensor device 10 may include a PMD camera which detects the stretching out of the lower arm and the gripping or pointing movement of the hand 24' (P3).

The sensor device 10 detects the operating gesture and/or the direction into which the body part 24 of the user points in the position 28 (S10). For this purpose, the sensor device 10 can detect the coordinates of the hand 24' within a coordinate system of an interior space of the motor vehicle. By the coordinates, the display devices 30, 34 involved in the synchronization are determined by the gesture detection device 16. Similarly, the data record 32 from the group of which in the data storage device 38 a further data record is to be displayed on the display device 34 to be synchronized can thus be determined by the gesture detection device 16.

Between the data storage device 38 and the display device 30 and between the data storage device 38 and the display device 34, a wireless or wired communication link 42 can be present. In the present example, the data records 32 and 40 of the group of data records G1 are present in the data storage device 38, both of which data records 32 and 40 have a common context and which, as a result, form one group. In the example, the common context corresponds to a warning message. As shown in FIG. 2, a further group of data records G2 includes the picture element 32' already displayed on the head-up display 30 which symbolizes a current occurring playing back of an audio file and which includes a text file 40' thematically linked to this which may include bibliographic data relating to the audio file 32'.

The detection of the operating gesture and/or of the coordinates of the operating gesture within the system of coordinates of the interior space of the motor vehicle (S10), the generation of a signal describing the operating gesture and its transmission to the gesture detection device 16 (S20) take place as already described in FIG. 1.

The gesture detection device 16 can determine by the direction, described by the signal of the sensor device 10, of the lower arm stretching out with the hand 24' (P4) that, the display device 30 is the display device which already displays a data record. Analogously thereto, the gesture detection device 16 can determine by the signal of the sensor device 10, which describes a pulling movement (P1, P2) and/or a direction of the body part 24 with the hand 24' in a second position (P5), that the display device 34 is the display device 34 to be synchronized. Alternatively, a throwing gesture in the direction of the second display device 34 can also be determined as a selection gesture for the display device 34 to be synchronized.

In addition, the gesture detection device 16 can determine by the direction (P3), described by the signal of the sensor device 10, of the lower arm stretched out with the hand 24' during the execution of the gripping movement (P4) that the data record 32 is the data record "selected" by the user. With the aid of the coordinates of the body part 24 within the system of coordinates of the interior space of the motor vehicle, the gesture detection device 16 can determine, for example, the axes of the lower arm and/or the finger axes. By these axes, the position 28 of the respective limb 24 can be determined. If the forearm axes then point to the picture element 32 as in the example of FIG. 2 and the gesture detection device 16 determines a gripping movement of the hand 24', the picture element 32 is selected. Alternatively, the gesture detection device 16 can detect a relative movement of the hand 24' and, as a result, can control a cursor of the display device 30, as a result of which the user can select the picture element 32. This detected selection of the picture element 32 is followed by the selection of the data record relating to the picture element 32. On this basis, the control device 18 can determine the predetermined thematic context and possibly the associated group of data records.

A further possibility for determining the thematic context is if the gesture detection device 16 generates on the basis of a determined operating gesture a control signal following which the control device 18 generates a synchronization signal and transmits the latter to the first display device (30). The first display device (30) thereupon transmits information relating to the thematic context of the first data record (32) to the control device (18).

In the present example, the control device 18 determines, for example, the group of data records G2. Alternatively or additionally to the example shown in FIG. 2, the control device 18 can call up the further data record 40. For example, the further data record may be called up from an Internet server. The Internet server may be a server of a motor vehicle manufacturer. The control device 18 can also generate the further data record on the basis of operating data. For example, the operating data may relate to an oil level.

The gesture detection device 16 generates a corresponding control signal to a control device 18 which, as already described with respect to FIG. 1, causes the data record 40 to be displayed. As shown in FIG. 2 the data record 40 may be displayed as a text message relating to the warning, on the display device 34 (S40). In the present example, the control device 18 causes the data storage device 38 to transfer the data record 40 to the display 34 of the infotainment system (S50).

The gesture detection device 16 can also be designed to extrapolate a trajectory (T) of a body part, that is to say, a part of the pulling movement represented by the positions P1 and P2, and to check it to see whether it will represent a pulling and/or gripping movement. Thus, the user can "nudge", that is to say only indicate, the "displacement" of the data record (that is to say the synchronization of the display devices 30, 34). For example, such a "nudge" may be performed in a situation in which the user must unexpectedly quickly pull back his arm to the steering wheel. This means that he does not have to execute the operating gesture to its end.

The examples illustrate the principle of the proposals according to which a physically correct locatability of the passengers (for example, by a TOF camera or a PMD camera) or of body parts of the passenger allows an approach to a surface to be detected. To displace information (contexts) from one display device to another display device, a gesture can be used. For example, a warning symbol can be displayed in a head-up display. In a non-limiting example, by reaching in the direction of the warning symbol and pulling it in the direction of the center display, a detailed description of the warning can appear.

This provides for a universal interaction between the displays (in addition to an enhancement of the joy-of-use factor). In addition, the interaction does not require any pushbuttons.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for synchronizing in a motor vehicle, comprising:
    detecting, using an optical sensor device and 3D image data, an operating gesture of a user which comprises a movement of a body part of the user, carried out freely in a space;
    generating a gesture signal describing the operating gesture and transmitting the gesture signal to a gesture detection device;
    identifying the operating gesture at the gesture detection device;
    identifying an origin display device of the motor vehicle and a target display device of the motor vehicle, the origin display device and the target display device being identified at the gesture detection device using the gesture signal;
    identifying a first origin data record selected by the operating gesture, the first origin data record being identified at the gesture detection device, the first origin data record being one of a plurality of origin data records simultaneously displayed by the origin display device, the first origin data record comprising a first display content relating to a first predetermined thematic context;
    receiving a control signal at a control device, the control signal being received from the gesture detection device, the control signal describing the first origin data record;
    determining the first predetermined thematic context of the first origin data record based on the control signal, the first predetermined thematic context being determined at the control device;
    determining a further data record based on the first predetermined thematic context, the further data record having a second display content for the first predetermined thematic context; and
    displaying the further data record on the target display device so as to synchronize the origin display device and the target display device,
    wherein
    a second origin data record among the plurality of origin data records comprises a third display content relating to a second predetermined thematic context,
    the first predetermined thematic context is common to the first origin data record and the further data record and includes information on a first vehicle system relating to operation of the motor vehicle, and
    the second predetermined thematic context is common to the second origin data record and another data record having a fourth display content for the second predetermined thematic context, and includes information on a second vehicle system relating to operation of the motor vehicle.

2. The method according to claim 1, wherein the first predetermined thematic context is a warning notice relating to operation of the motor vehicle.

3. The method according to claim 1, wherein
    the control device comprises a program module of the origin display device, and
    based on the control signal from the gesture detection device, the control device transmits context data relating to the first predetermined thematic context to the second display device.

4. The method according to claim 1, wherein the further data record is provided by at least one of the following:
    the control device calls up the further data record from a motor-vehicle-external data server,
    the control device generates the further data record based on operating parameters of the motor vehicle,
    the control device controls transmission of the further data record from a data storage device to the target display device, and
    the control device provides the further data record in a motor-vehicle-internal data memory for the target display device.

5. The method according to claim 4, wherein the gesture detection device, for detecting at least a part of the operating gesture, checks a trajectory of the body part to determine whether the operating gesture describes a pulling movement or a pulling and gripping movement from the origin display device to the target display device.

6. The method according to claim 5, wherein the gesture detection device uses the operating gesture to synchronize the origin display device with the target display device only if the operating gesture describes a pulling movement or a pulling and gripping movement from the origin display device to the target display device.

7. The method according to claim 1, wherein the gesture detection device, for detecting the operating gesture, extends a trajectory of the body part by extrapolation, and checks whether the trajectory of the body part, as extended, represents a pulling movement or a pulling and gripping movement.

8. The method according to claim 1, wherein
the sensor device generates the 3D image data, and
the sensor device comprises at least one of a time-of-flight (TOF) camera of the motor vehicle, a Photonic Mixer Device (PMD) camera of the motor vehicle and a stereocamera of the motor vehicle.

9. The method according to claim 1, wherein
the origin display device is a head-up display, and
the target display device is a display of an infotainment system above a center console of the motor vehicle.

10. The method according to claim 1, wherein
the first origin data record is a symbol relating to the first predetermined thematic context, and
the further data record is description text relating to the first predetermined thematic context.

11. The method according to claim 1, wherein
the operating gesture includes a gripping movement to indicate selection of the first origin data record from among the plurality of origin data records simultaneously displayed by the origin display device, and a subsequent pulling movement to indicate that the further data record having the second display content is to be displayed on the target display device.

12. The method according to claim 11, wherein each of the plurality of origin data records displays a different symbol on the origin display device, each different symbol relating to a respective different predetermined thematic context relating to respective different vehicle systems.

13. The method according to claim 1, wherein
the first origin data record corresponds to a status of an audio vehicle system and the second origin data record corresponds to a fuel vehicle system, and
in response to the first origin data record being identified at the gesture detection device, displaying the further data record includes displaying descriptive text regarding the status of the audio vehicle system.

14. A motor vehicle comprising:
an optical sensor device to detect, using 3D image data, an operating gesture of a user which comprises a movement of a body part of the user, carried out freely in a space, to generate a gesture signal describing the operating gesture, and to transmit the gesture signal;
a gesture detection device to receive the gesture signal and to use the gesture signal to identify the operating gesture, to identify origin and target display devices of the motor vehicle, and to identify a first origin data record selected by the operating gesture, the origin data record being one of a plurality of origin data records simultaneously displayed by the origin display device, the origin data record comprising a first display content relating to a first predetermined thematic context; and
a control device to receive a control signal describing the first origin data record from the gesture detection device, and to determine the first predetermined thematic context of the first origin data record based on the control signal, wherein
a further data record is determined based on the first predetermined thematic context, the further data record having a second display content for the first predetermined thematic context, and
the further data record is displayed on the target display device so as to synchronize the origin display device and the target display device,
wherein
a second origin data record among the plurality of origin data records comprises a third display content relating to a second predetermined thematic context,
the first predetermined thematic context is common to the first origin data record and the further data record and includes information on a first vehicle system relating to operation of the motor vehicle, and
the second predetermined thematic context is common to the second origin data record and another data record having a fourth display content for the second predetermined thematic context, and includes information on a second vehicle system relating to operation of the motor vehicle.

* * * * *